United States Patent
Goolsby

[19]

[11] Patent Number: 6,059,959
[45] Date of Patent: May 9, 2000

[54] VARYING CARBON ON CATALYST TO MAGNETICALLY SEPARATE HIGH METALS CATALYST

[75] Inventor: Terry L. Goolsby, Katy, Tex.

[73] Assignee: Kellogg Brown & Root, Inc., Houston, Tex.

[21] Appl. No.: 09/067,679

[22] Filed: Apr. 28, 1998

Related U.S. Application Data

[63] Continuation-in-part of application No. 08/598,301, Feb. 8, 1996, abandoned.

[51] Int. Cl.$^7$ .................................................. C10G 11/00
[52] U.S. Cl. ..................... 208/113; 208/120.01; 208/152; 502/514; 502/518
[58] Field of Search ............................ 208/113, 120.01; 208/152; 502/514, 518

[56] References Cited

U.S. PATENT DOCUMENTS

| | | | |
|---|---|---|---|
| Re. 31,439 | 11/1983 | Rosensweig | 34/1 |
| Re. 35,046 | 10/1995 | Hettinger, Jr. et al. | 208/124 |
| 3,711,422 | 1/1973 | Johnson et al. | 502/31 |
| 4,359,379 | 11/1982 | Ushio et al. | 208/120 |
| 4,406,773 | 9/1983 | Hettinger, Jr. et al. | 208/120 |
| 4,482,450 | 11/1984 | Ushio et al. | 208/152 |
| 4,727,823 | 3/1988 | Thompson et al. | 118/652 |
| 4,823,102 | 4/1989 | Cherian et al. | 335/306 |
| 4,882,043 | 11/1989 | Jung | 209/212 |
| 5,147,527 | 9/1992 | Hettinger | 208/120 |
| 5,171,424 | 12/1992 | Hettinger | 208/121 |
| 5,190,635 | 3/1993 | Hettinger | 208/113 |
| 5,198,098 | 3/1993 | Hettinger, Jr. | 208/85 |
| 5,230,869 | 7/1993 | Hettinger et al. | 422/144 |
| 5,250,482 | 10/1993 | Doctor | 502/5 |
| 5,328,594 | 7/1994 | Hettinger | 208/121 |
| 5,364,827 | 11/1994 | Hettinger et al. | 502/338 |
| 5,393,412 | 2/1995 | Hettinger | 208/120 |
| 5,448,803 | 9/1995 | Morell | 19/272 |
| 5,538,624 | 7/1996 | Hettinger | 208/121 |

OTHER PUBLICATIONS

Magnet Terminology Glossary, Magnet Sales and Manufacturing, Inc.—no date.

*Primary Examiner*—Walter D. Griffin
*Assistant Examiner*—Nadine Preisch
*Attorney, Agent, or Firm*—Kellogg Brown & Root, Inc.

[57] ABSTRACT

This process controls the magnetic separation of high metals catalyst by influencing the magnetic susceptibility by carbon levels on catalyst. In an FCC/RCC® operation employing magnetic separation of catalyst, particularly where the catalyst has enough metals to exhibit a high magnetic susceptibility, e.g., $110 \times 10^{-6}$ emu/g or higher, all of the catalyst may be attracted to the magnet and go to the magnetic reject side. By controlling the amount of carbon, coke, or graphite present on the catalyst after partial regeneration, the magnetic properties of the catalyst can be diminished and separation can occur. Varying the amount of carbon affects the magnetic metals, the higher the magnetic susceptibility, and yet the catalyst particles will have a lower carbon level. The lower the magnetic susceptibility, the less metals, the higher the activity, and the higher the coke/carbon content.

7 Claims, 4 Drawing Sheets

VARYING CARBON ON CATALYST TO MAGNETICALLY SEPARATE HIGH METALS CATALYST

CROSS REFERENCE TO RELATED APPLICATION

This application is a continuation-in-part of U.S. Ser. No. 08/598,301, filed Feb. 8, 1996, abandoned.

FIELD OF THE INVENTION

The present invention relates to the field of magnetic separation of hydrocarbon conversion catalysts and related apparatus, generally classified in U.S. Pat. Class 208/113 and/or 208/120.

BACKGROUND OF THE INVENTION

U.S. Pat. No. 4,406,773 to Hettinger, Jr. et al. teaches hydrocarbon conversion in conjunction with a magnetic separator.

U.S. Pat. No. 5,147,527 to Hettinger teaches a combination of hydrocarbon conversion by contact with fluidized particles and the magnetic separation of such particles on a moving belt to reject highly metal contaminated particles.

U.S. Pat. No. 5,230,869 to Hettinger et al. teaches hydrocarbon conversion apparatus comprising magnetic separator means and means for adding a magnetically active moiety onto particles circulating in a hydrocarbon conversion system so that the moiety deposits on the circulating particles proportionate with the time the particles have been circulating in the hydrocarbon conversion system.

U.S. Pat. No. 5,171,424 to Hettinger teaches a hydrocarbon conversion process comprising addition of a paramagnetic active heavy rare earth-containing compound to catalyst circulating in the hydrocarbon conversion system, and separation of particles containing higher concentrations of paramagnetic heavy rare earth by magnetic separation means.

U.S. Pat. No. 5,393,412 to Hettinger teaches recovering and reconditioning metal-laden particulate catalyst or sorbent by passing it through a magnetic separator to separate out high metal low activity particulate and passing the metal laden particulate through a particle size classifier and/or passing a portion of the larger particles to attriting means wherein the larger particles are reduced in size and metal content.

Re. 35,046 (formerly U.S. Pat. No. 5,106,486) to Hettinger, Jr. et al. teaches hydrocarbon conversion comprising intentionally adding continuously or periodically a magnetically active moiety so it deposits on the particles over a period of time and separating out older particles added earlier to the system from newer particles later added, by magnetic means.

U.S. Pat. No. 5,190,635 to Hettinger teaches operating a hydrocarbon conversion process for contacting hydrocarbons containing various amounts of iron, nickel and/or vanadium with particles wherein metals are deposited on the particles, operating the conversion process so as to accumulate on said particles at least 4500 ppm iron compounds and so as to render at least a portion of said iron compounds supermagnetic or ferromagnetic, and magnetically separating more highly magnetic particles from less magnetic particles and recycling at least a portion of the less magnetic particles.

The above prior art teaches the advantages and techniques useful for the magnetic separation of hydrocarbon conversion catalysts which have been contaminated by metals and thereby reduced in conversion activities. Previously, the separation could be varied only by changing the speed (drum rotation or disc rotation in drum and disc magnetic separators) and the thickness of the belt, drum or disc as well as the magnetic field to which the catalyst particles are subjected and also by varying the splitter setting so that the cut (percent rejected) is varied as the catalyst moves off the element which conveys the catalyst through the magnetic field in the magnetic separation device. The present invention adds a new variable for the more close control of the separating out of the metal contaminated catalyst and extends the applicability of magnetic separation even to catalyst particles which are so metal contaminated that they previously posed problems in magnetic separations due to their extremely high magnetic susceptibilities.

SUMMARY OF THE INVENTION

In an FCC/RCC® operation employing magnetic separation of catalyst, regenerated catalyst has been separated into inactive catalyst with a high magnetic susceptibility, high metal level catalyst which is discarded and an active catalyst with relatively low magnetic susceptibility and low metal content. In contrast to the prior art teaching that carbon content is not a factor in magnetic beneficiation, the present invention resides in the surprising discoveries (1) that the presence of carbon tends to magnetically shield and reduce the magnetic susceptibility of catalyst particles, (2) the coke tends to deposit more readily on high activity, low-metals-content catalyst and (3) that coke tends to burn off more quickly from high-metal-content catalyst particles. Thus, by magnetically separating catalyst particles containing minor coke or carbon levels, as is obtained by beneficiating only partially regenerated catalyst, the active low-metals-content catalyst particles are rendered less magnetically susceptible and less likely to be retained in the magnetic field. At the same time, the high-metals-level catalyst contains less carbon, by virtue of having less coke laid down on it and being more quickly regenerated, and is more likely to be retained in the magnetic field. The net result is that magnetic separation between the high- and low-metals-content catalyst fractions is enhanced and more efficient—the high-metals-content fraction without the carbon "shielding" is more likely to be retained by the magnetic field while the low-metals-content fraction with carbon "shielding" is more likely to be separated and returned to the process.

The coke content of the catalyst being magnetically separated can be controlled by withdrawing the catalyst from the FCC unit at a location where there is only partial regeneration. Preferably, the catalyst is only partially regenerated and the carbon level is controlled by the extent of regeneration.

DETAILED DESCRIPTION OF THE INVENTION

Figure 1:
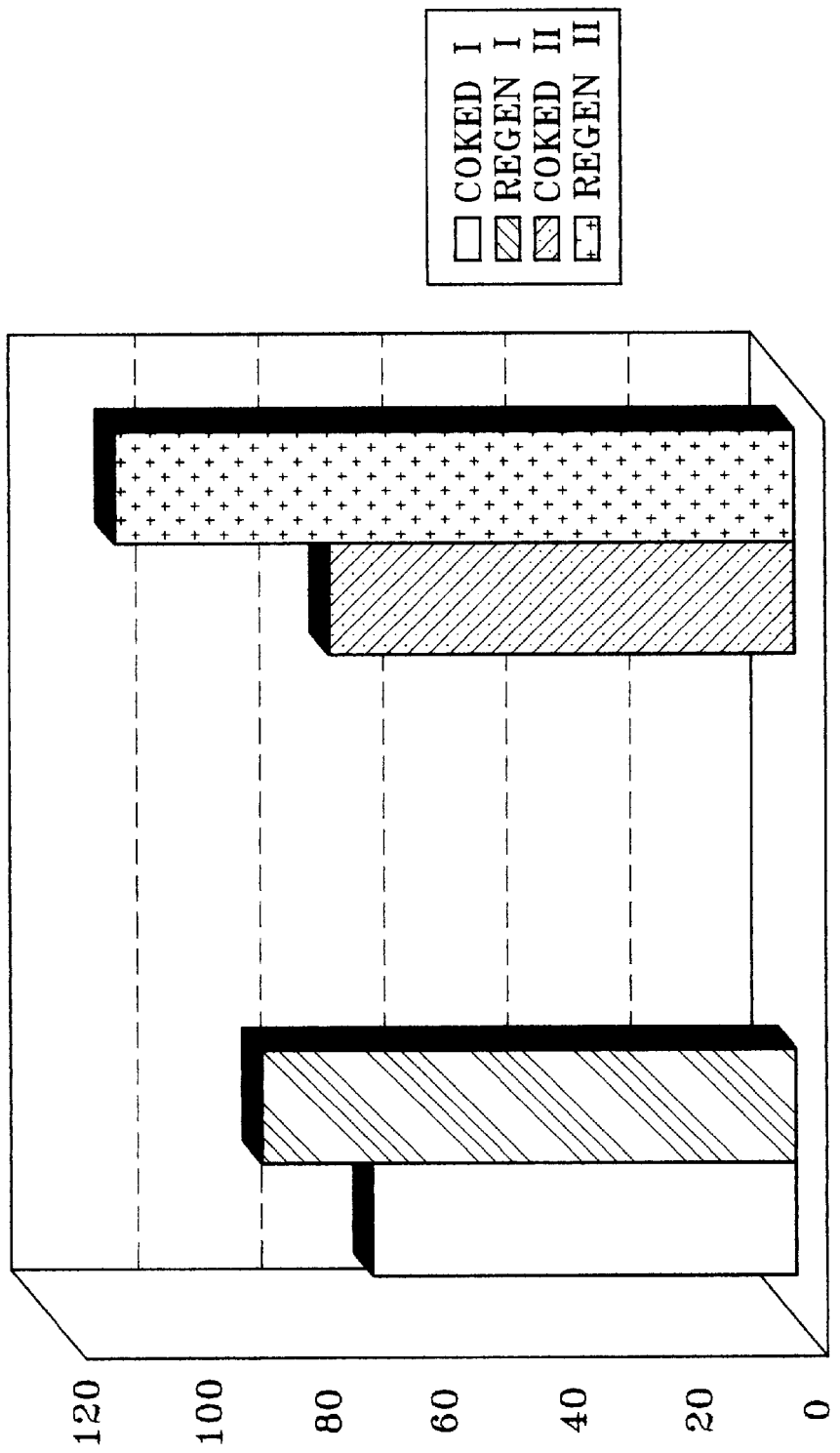
FIG. 1 shows the effect of coke upon the magnetic susceptibility and explains the basis for the enhancement of magnetic susceptibility which is achieved by the present invention's coating of coke (carbon) onto the catalyst particles. It is especially important to understand that high-activity particles will generally preferentially receive coke deposits, and less preferentially be regenerated, thus more sharply differentiating their magnetic susceptibilities from those of lower activity particles on which coke will not be deposited so rapidly and which will be more readily regenerated.

The feeds used with the present invention are not narrowly critical and my include conventional feeds for those processes listed below. Particularly preferred will be residual petroleum feeds including reduced crude, top crude, vacuum bottoms, and other metal-containing hydrocarbon fractions. However, the addition of "magnetic hooks" permits the invention to also be used with gas oils and other hydrocarbon feeds containing little or no metals.

The temperature in the reactor will range in the area from about 454–593° C. (850–1100° F.) more preferably from 482–566° C. (900–1050° F.) and most preferably from 510–549° C. (950–1025° F.). The regenerator temperature will be in the range of from about 371° C. (700° F.) or more preferably 649–816° C. (1200–1500° F.) most preferably from above 704° C. (1300° F.) when the invention is used with fluid catalytic cracking or resid cracking processes such as RCC® process.

The present invention is applicable to a wide variety of hydrocarbon conversion catalysts including those employed in catalytic cracking, hydrocracking, reforming, hydrodesulfurization, hydrotreating, sorbent processes such as those disclosed in the above U.S. patents and in November 1990 *Hydrocarbon Processing Refining Processes Handbook*, and other processes where metal-containing feedstocks are contacted with catalyst particles. The invention enhances the separation of metal-contaminated particles in conversion catalyst (which can also include sorbent particles) commonly used in petroleum refinery operation. The present invention will be valuable with any of the feeds which can be conventionally used in conjunction with magnetically separated hydrocarbon conversion catalysts, including resids, vacuum resids, atmospheric resids, topped crude, reduced crude, and combinations of hydro-treater feed, hydro-treated materials and virtually any hydrocarbon conversion process feed which contains some amount of metals. The invention can also be used in conjunction with "magnetic hooks" as taught by U.S. Pat. Nos. 5,230,869; 5,171,424 and RE 35,046 where magnetic moieties are deliberately added to the feed in order to gradually build up on the catalyst over time, thus selectively tagging those catalyst particles which have been circulating in the system for a long time and have presumably lost activity.

The flow rates, etc. are those well-known to persons skilled in the art of hydrocarbon conversion and need not be modified in order to employ the present invention.

The present invention can be employed in a continuous fashion with withdrawals of catalyst being made continuously throughout the day of operation or catalyst can be withdrawn periodically in batches, for example, once per day as is common for catalyst withdrawal from fluid catalytic cracking (FCC) units. The magnetic separator need not be located directly near or connected directly to the FCC or other hydrocarbon conversion units, but the magnetic separation step can be employed off-site e.g., where equilibrium catalysts are being processed.

The hydrocarbon conversion catalyst valuable for employment in the present invention can be FCC, RCC® process catalyst, continuous catalytic reforming or other reforming catalyst, hydro-desulfurization catalyst, etc. Their size range in terms of average diameter, the preferred coke-on-catalyst and the preferred magnetic susceptibility are set forth in Table B.

The typical catalyst manufacturers include: Davison Division of W. A. Grace, AKZO, InterCat, Englehard, ICC of Japan, American Cyanamid, CYTEC division, Institute Francaise Du Petrole, and others.

The activity in terms of microactivity (MAT) is not narrowly critical and will vary within conventional ranges from about 85–50 for cracking catalyst and other measures will be used for measuring the activity of reforming hydro-desulfurization, etc. catalyst.

Table A summarizes preferred, more preferred and most preferred parameters of the process of the invention.

TABLE A

| | PROCESS | | | |
|---|---|---|---|---|
| Parameter | Units | Preferred | More Preferred | Most Preferred |
| Withdrawn Catalyst/day | % of total in FCC | 0.5–15 | 1–10 | 2–8 |
| Belt Speed | ft/min | 100–400 | 150–340 | 250–325 |
| Belt Thickness | Mils | 5–100 | 7–70 | 10–40 |

Table B summarizes preferred, more preferred and most preferred parameters of the composition of the invention.

TABLE A

| | COMPOSITIONS | | | |
|---|---|---|---|---|
| Parameter | Units | Preferred | More Preferred | Most Preferred |
| Catalyst MAT Activity | vol % | 85–50 | 80–55 | 75–60 |
| Catalyst type | — | zeolite, silica, lumina, etc. | | |
| Metal-on-Catalyst Feed to Magnetic Separation | ppm | 10–25,000 | | 100–15,000 |
| Mag. Susceptibility of Catalyst Separated | $10^{-6}$ emu/g (mass) | 1–200 | 5–150 | 30–125 |

TABLE A-continued

COMPOSITIONS

| Parameter | Units | Preferred | More Preferred | Most Preferred |
|---|---|---|---|---|
| Catalyst Particle Size (avg. dias) | microns | 5–250 | 10–150 | 50–100 |
| Coke carbon on Catalyst | wt. % | 0.01–5 | 0.05–3 | 0.1–1.0 |

Table C summarizes preferred, more preferred and most preferred paramaters of the apparatus of the invention.

TABLE C

APPARATUS

| Elements | Units | Preferred | More Preferred | Most Preferred |
|---|---|---|---|---|
| Catalyst Regenerator | — | Single stage or multi stage | | Single stage |
| Magnetic Separator | | Moving element passes through mag. field | Belt, drum, disc | Belt |
| Wt % of withdrawn catalyst rejected | wt % | 2–40 | 3–30 | 5–15 |
| Auxiliary Equipment | | Classifier or attritor | | Classifier or attritor |

EXAMPLE

Figure 4:
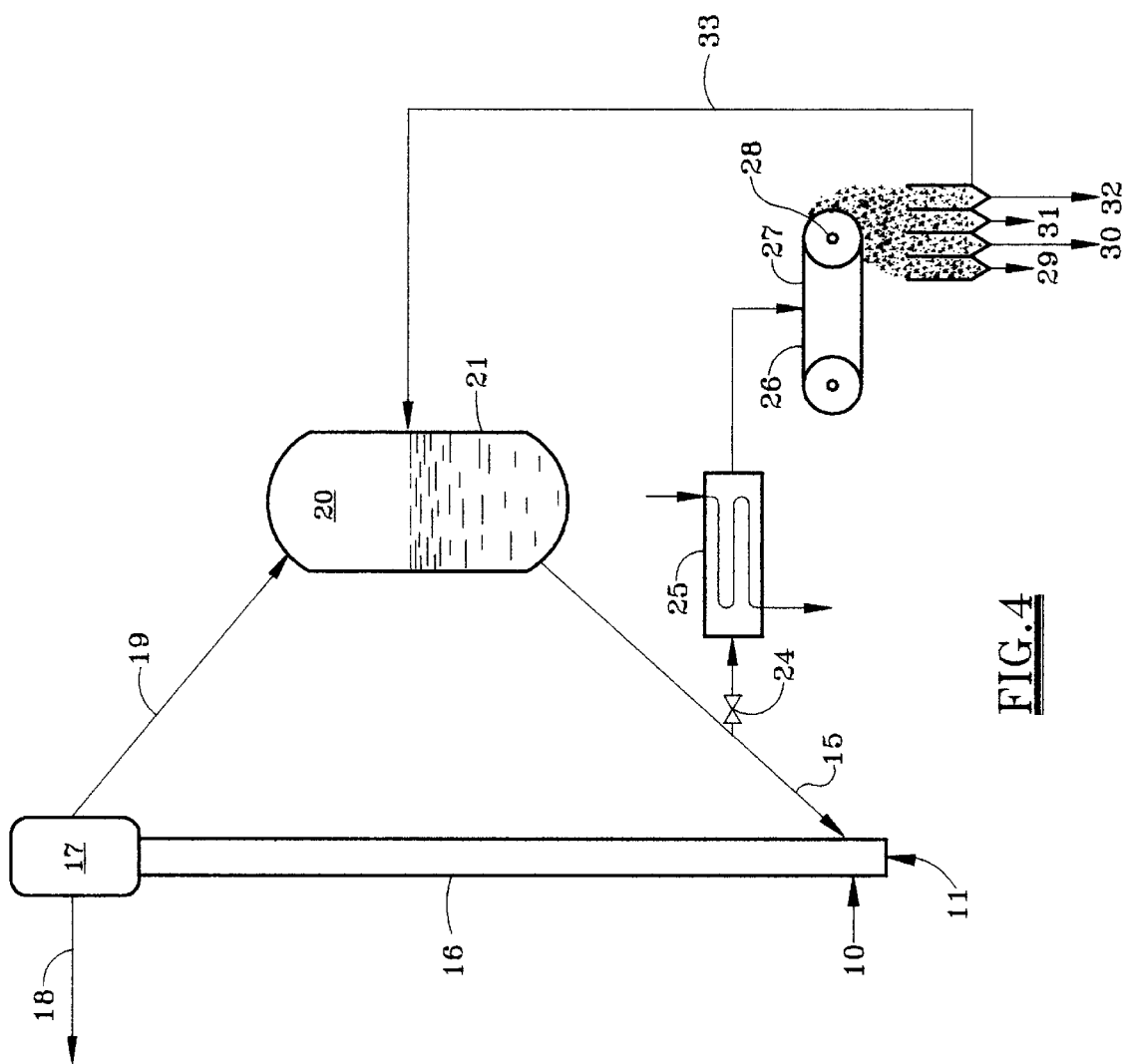
FIG. 4 is a schematic diagram of a preferred embodiment of the present invention showing a conventional FCC unit being fed residual oils. The riser reactor contact zone for contacting catalyst with the hydrocarbon feed and the other conventional elements, together with a magnetic separator, both the belt-roller design operating to reject low-activity high-metal catalyst and permit recycling of high-activity low-metal catalyst as more fully described in illustrative embodiment.

FIG. 4 shows a preferred process employing the present invention. Bottoms 10 derived from distilling off a portion of crude oil entering the conventional riser reactor at 11. In the riser, the reduced crude contacts regenerated catalysts returning from the regenerator line 15 and traveling up the riser 16, cracking the reduced crude and generating product 18 and spent catalyst 17 which is contaminated with coke and metals from the reduced crude. The spent catalyst 17 enters the regenerator 20 via line 19 and is partially oxidized with air 21 to burn off coke and thereby partially regenerate the catalyst for return to the riser 16. About 8% of the regenerated catalyst is diverted through line 24 through catalyst cooler 25 (optional) to magnetic separator 26, where it is spread onto belt 27, moves past roller 28, (a high intensity rare earth-containing permanent magnetic roller) which splits the catalyst into two (or more) portions 29 and 32. The more magnetic (more metal-contaminated) portions, e.g., 29, and/or 31 and 32 are rejected for chemical reclaiming, metals recovery, further magnetic separation, or disposal. The less magnetic (less metal-contaminated and containing small amounts of residual carbon or coke) portions 31 and/or 32 are recycled through line 33 back to the regenerator 20.

COMPARATIVE EXAMPLE

Referring to FIG. 4 again, the same process is repeated except that the carbon-on-catalyst is completely removed in regenerator 20 so that the present invention's purpose of leaving some carbon remaining is not accomplished. The results are dramatically higher magnetic susceptibilities (Xg, $10^{-6}$ emu/g) for the regenerated catalyst as compared to the magnetic susceptibilities when laden with coke/carbon.

FIG. 1 shows the magnetic susceptibility before separation for two different catalysts (I and II). Each catalyst is shown with coke (containing approximately 2.5% by weight carbon) and partially regenerated (containing approximately 0.05% by weight carbon). As can be seen, the magnetic susceptibility is substantially enhanced by the removal of the coke. This means that the carbon layer produced by the techniques of the present invention moderates the magnetic susceptibility of the catalyst, enhancing its separation.

Figure 2:
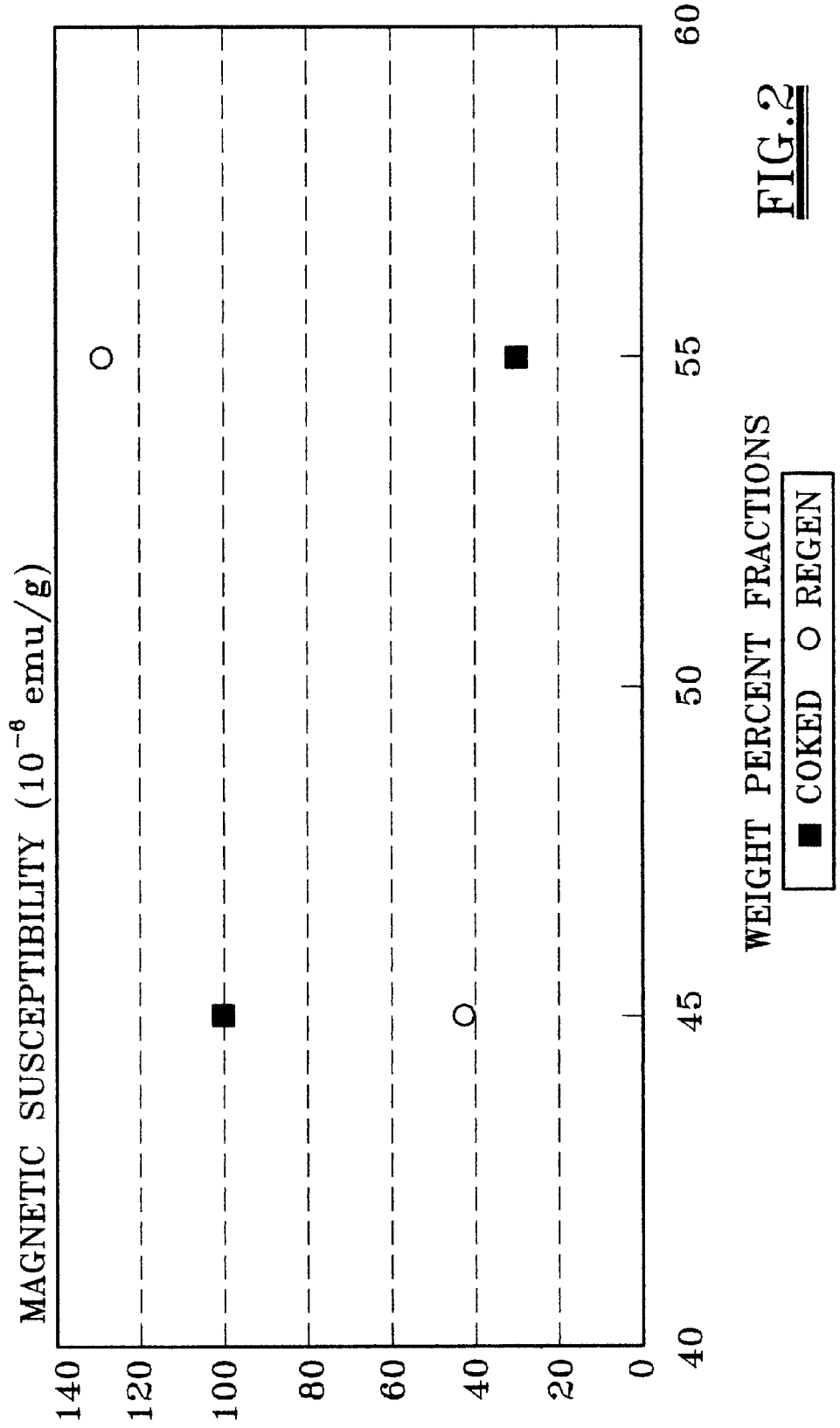
FIG. 2 shows the effect of coke upon magnetic separation for both coked and fully regenerated (coke removed) catalyst.
Figure 3:
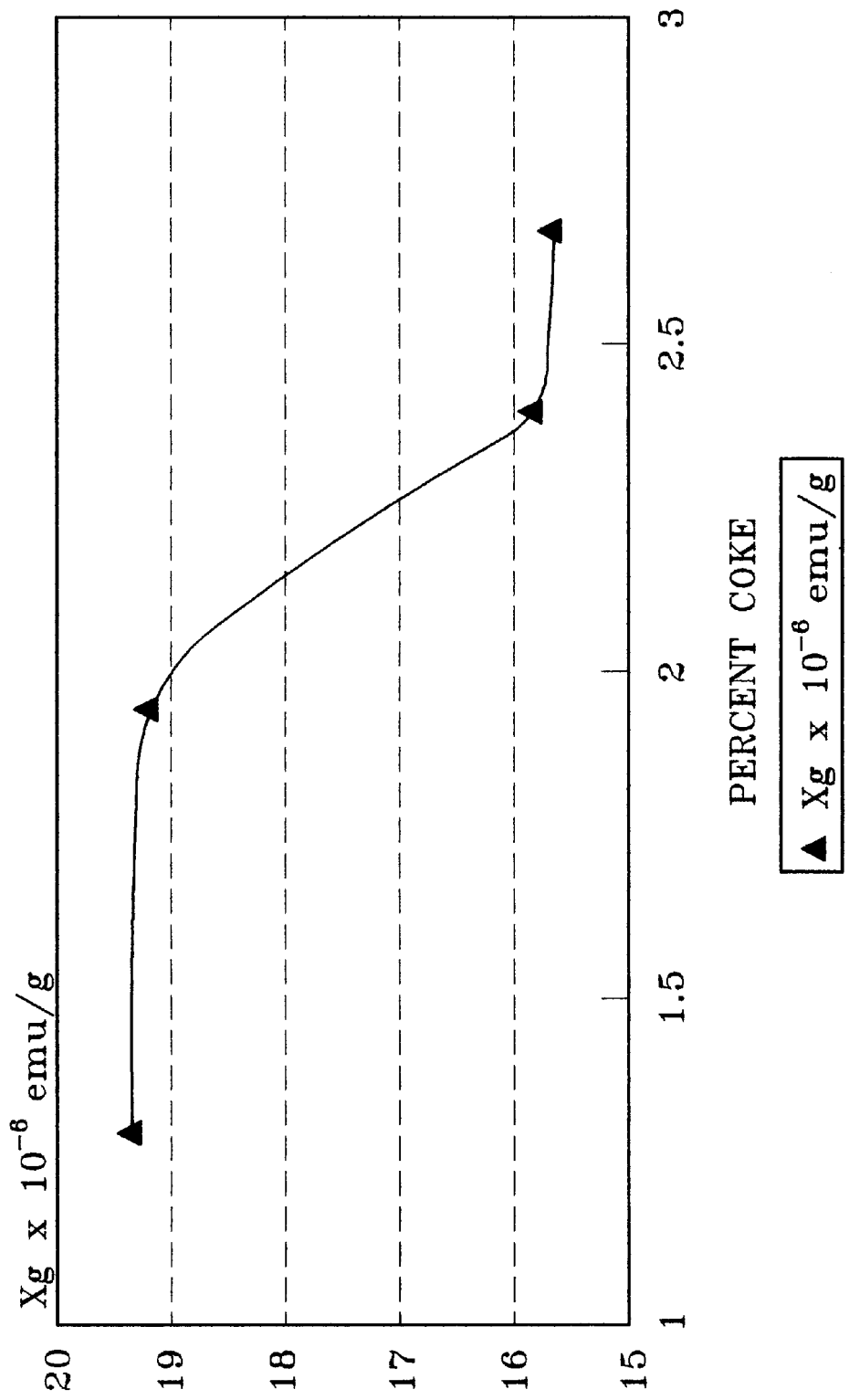
FIG. 3 shows the effect of coke upon low-metal fraction coke cracking catalyst.

Similarly, FIG. 2 shows the effect of coke upon the magnetic separation results where both coked and regenerated (this time using a single catalyst) catalyst are tested. The weight % off the magnetic separator is the ordinate and the abscissa is the magnetic susceptibility. In magnetic separation results, the coked catalyst yields a lesser amount of high metals magnetic reject fraction and greater amount of lower metals fraction than the regenerated catalyst.

TABLE I

EFFECT OF COKE ON MAGNETIC SUSCEPTIBILITY

| I | L (cm)* | Wt/Gram | R | Xg ($10^{-6}$ emu/g) | Avg. Xg ($10^{-6}$ emu/g) |
|---|---|---|---|---|---|
| Coked | 4.0 | 0.30 | 5460 | 76.44 | |
| Sample | 3.6 | 0.27 | 4630 | 64.82 | 69.4 |
| | 3.8 | 0.28 | 4700 | 66.98 | |

TABLE I-continued

EFFECT OF COKE ON MAGNETIC SUSCEPTIBILITY

|  | L (cm)* | Wt/Gram | R | Xg ($10^{-6}$ emu/g) | Avg. Xg ($10^{-6}$ emu/g) |
|---|---|---|---|---|---|
| Regenerated | 3.5 | 0.27 | 6020 | 81.93 | |
| Sample | 4.0 | 0.29 | 6650 | 96.31 | 87.7 |
|  | 3.6 | 0.27 | 6080 | 85.12 | |
| II | L (cm)* | Wt/Gram | R | Xg ($10^{-6}$ emu/g) | |
| Coked | 4.0 | 0.31 | 5150 | 69.77 | |
| Sample | 4.1 | 0.31 | 5440 | 75.55 | 72.66 |
|  | L(cm)* | Wt/Gram | R | Xg($10^{-6}$ emu/g) | |
| Regenerated | 3.9 | 0.28 | 7640 | 111.74 | |
| Samle | 4.0 | 0.29 | 7520 | 108.91 | 110.33 |

*L = the length of the packed bed catalyst in the measurement tube for magnetic susceptibility

TABLE II

MAGNETIC SEPARATION
MAGNETIC SUSCEPTIBILITY MEASUREMENTS

| Coked Sample | L (cm)* | Wt/Gram | R | Xg ($10^{-6}$ emu/g) | Avg. Xg ($10^{-6}$ emu/g) |
|---|---|---|---|---|---|
| 1-MAG | 3.0 | 0.26 | 7230 | 102.19 | |
|  | 3.7 | 0.27 | 6720 | 96.69 | 99.44 |
| 2-Other | 3.6 | 0.27 | 2170 | 30.38 | |
|  | 3.9 | 0.29 | 2100 | 29.65 | 30.02 |
| Regenerated Sample | L (cm)* | Wt/Gram | R | Xg ($10^{-6}$ emu/g) | Avg. Xg ($10^{-6}$ emu/g) |
| 1-MAG | 3.6 | 0.26 | 8430 | 122.56 | |
|  | 3.8 | 0.27 | 8990 | 132.85 | 127.7 |
| 1-Other | 3.7 | 0.28 | 3020 | 41.10 | |
|  | 3.8 | 0.28 | 2980 | 42.47 | 42.19 |

*L = the length of the packed bed catalyst in the measurement tube for magnetic susceptibility Specific compositions, methods, or embodiments discussed are intended to be only illustrative of the invention disclosed by this specification. Variation on these compositions, methods or embodiments are readily apparent to a person of skill in the art based upon the teachings of this specification and are therefore intended to be included as part of the inventions disclosed herein. Reference to documents made in the specification is intended to result in such patents or literature being expressly incorporated herein by reference.

What is claimed is:

1. A hydrocarbon conversion process, comprising the steps of:
   (a) contacting a metals containing hydrocarbon feed with catalyst under conversion conditions to produce converted feed products and catalyst laden with coke and deposited metals from said feed, wherein the coke is preferentially deposited on relatively more active catalyst particles;
   (b) separating the catalyst from the converted feed products;
   (c) partially regenerating the catalyst in a regenerator by contact with an oxygen-containing gas to obtain partially regenerated catalyst containing about 0.05–3 weight percent carbon, wherein the carbon is preferentially removed from relatively high metal catalyst particles;
   (d) further regenerating the partially regenerated catalyst from step (c) to a carbon-on-catalyst level below 0.05 weight percent;
   (e) recycling the further regenerated catalyst from step (d) to step (a);
   (f) withdrawing a portion of the catalyst from step (c);
   (g) magnetically separating the withdrawn catalyst from step (f) into a relatively high metals fraction which is discarded and a relatively low metals fraction which is recycled to step (c), step (d) or step (e).

2. The process of claim 1 wherein said partially regenerated catalyst in step (c) contains about 0.1–1.0 weight percent carbon based on the weight of the catalyst.

3. The process of claim 1 wherein said magnetic separation step is conducted in apparatus comprising a magnetic separator having a moving element which passes catalyst through a magnetic field.

4. The process of claim 3 wherein said moving element comprises a belt, a drum or a disc.

5. The process of claim 4 wherein about 2 to 80 weight percent of the catalyst withdrawn is recycled back for contact with further hydrocarbons.

6. The process of claim 1 wherein said catalyst separated out in step (g) comprises approximately 0.5 to 50% by weight of the total catalyst in the process in which said hydrocarbon feed contacts said catalyst.

7. The process of claim 1 wherein the carbon content of the partially regenerated catalyst in step (c) is present in an amount sufficient to reduce a magnetic susceptibility of said catalyst particles by at least about 20%.

* * * * *